United States Patent Office.

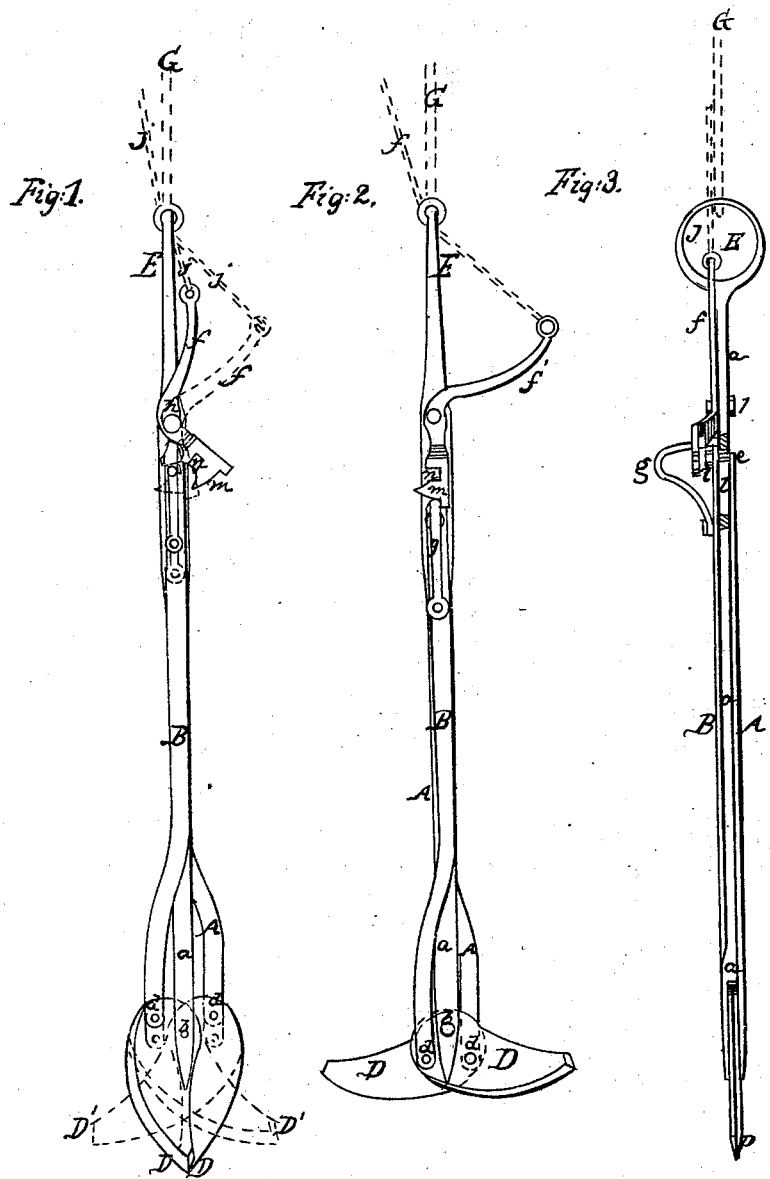

GEORGE M. ROBINSON, OF NEW WILMINGTON, PENNSYLVANIA.

Letters Patent No. 77,843, dated May 12, 1868.

IMPROVEMENT IN HORSE HAY-FORKS.

*The Schedule referred to in these Letters Patent and making part of the same.*

TO ALL WHOM IT MAY CONCERN:

Be it known that I, GEORGE M. ROBINSON, of New Wilmington, in the county of Lawrence, and State of Pennsylvania, have invented a new and improved Horse-Power Hay-Fork; and I do hereby declare that the following is a full, clear, and exact description thereof, which will enable those skilled in the art to make and use the same, reference being had to the accompanying drawings, forming part of this specification, in which—

Figure 1 is a view of my improved fork, with the cutters closed for discharging the hay.

Figure 2 is a view of the fork with the cutters extended, as when lifting hay.

Figure 3 is an edge view of the fork.

Similar letters of reference indicate corresponding parts.

The object of this invention is to furnish a hay-fork which shall be simple and efficient in lifting and discharging hay.

It consists of cutters D D, pivoted within the forked end of a centre-bar, $a$, and pivoted also to slide-bars A and B, as shown.

The slide-bars are connected with each other, at their upper ends, by the reduced end of the bar A passing through the slot $l$ in the centre-bar, as shown at $e$, and through a hole in the bar B, where it is held firmly by a nut, $i$, as shown.

The bar B is bent to form the handle $g$, as shown.

By the sliding of the bars A and B, the cutters are extended, as shown at fig. 2, or brought together to form a point for discharging the hay held thereon, as shown at fig. 1.

The centre-bar $a$ terminates in a ring, E, to which the lifting-rope G is attached.

The tripping line $j$ passes through this ring, whereby it will operate the trip-lever $f$ at any position of the same.

The trip-lever is formed with a notch, $n$, to catch upon the handle $g$, and thus hold the cutters in a proper position for cutting hay, as shown at the red outline of fig. 1.

The cam-surface, $m$, of the lever bears against the handle $g$, and thus holds the cutters extended, as shown at fig. 2.

The lever then will be at the position $f'$.

The lever is pivoted at $h$ to the centre-bar, and above the slot $l$ of that bar, so that it is free to operate in the manner shown.

The operation of this fork is obvious.

I claim as new, and desire to secure by Letters Patent—

The combination of the bars A and B, cutters D D, slotted centre-bar $a$, trip-lever $f$, having the notch $n$ and cam-surface $m$, all constructed and operating together, substantially as shown and described, and for the purpose set forth.

GEORGE M. ROBINSON.

Witnesses:
J. S. MEANS,
F. MEANS.